United States Patent [19]

Broughton et al.

[11] Patent Number: 4,807,031

[45] Date of Patent: Feb. 21, 1989

[54] INTERACTIVE VIDEO METHOD AND APPARATUS

[75] Inventors: Robert S. Broughton, Beaverton, Oreg.; William C. Laumeister, San Jose, Calif.

[73] Assignee: Interactive Systems, Incorporated, Beaverton, Oreg.

[21] Appl. No.: 112,713

[22] Filed: Oct. 20, 1987

[51] Int. Cl.$^4$ .................. H04N 7/08; A63F 9/22

[52] U.S. Cl. .................... 358/142; 358/146; 358/147; 358/93; 273/DIG. 28; 364/513

[58] Field of Search ............... 358/93, 146, 147, 13, 358/14, 15, 113, 142; 340/702, 707, 720, 721; 434/308, 323; 273/DIG. 28, 312, 313; 364/513

[56] References Cited

U.S. PATENT DOCUMENTS

| | | | |
|---|---|---|---|
| 3,292,489 | 12/1966 | Johnson et al. | 353/25 |
| 3,369,073 | 2/1968 | Scholz | 358/146 |
| 3,493,674 | 2/1970 | Houghton | 358/147 |
| 3,566,482 | 3/1971 | Morchand | 434/323 |
| 3,599,221 | 8/1971 | Baer | 346/1.1 |
| 3,663,937 | 5/1972 | Bolner | 340/937 |
| 3,671,668 | 6/1972 | Reiffel | 358/93 |
| 3,728,480 | 4/1973 | Baer | 358/93 |
| 3,737,566 | 6/1973 | Baer et al. | 358/93 |
| 3,743,767 | 7/1973 | Bitzer et al. | 358/93 |
| 3,777,410 | 12/1973 | Robinson | 434/323 |
| 3,872,461 | 3/1975 | Jarosik et al. | 340/715 |
| 3,891,792 | 6/1975 | Kimura | 358/142 |
| 3,900,887 | 8/1975 | Soga et al. | 360/18 |
| 3,976,992 | 8/1976 | Criscimagna et al. | 340/708 |
| 3,993,861 | 11/1976 | Baer | 358/142 |
| 4,186,413 | 1/1980 | Mortimer | 358/146 |
| 4,205,847 | 6/1980 | Steiger et al. | 273/313 |
| 4,206,557 | 6/1980 | Swinton | 434/323 |
| 4,210,329 | 7/1980 | Steiger et al. | 273/313 |
| 4,218,697 | 8/1980 | Leventer | 358/147 |
| 4,306,630 | 12/1981 | Monte et al. | 180/167 |
| 4,329,684 | 5/1982 | Monteath et al. | 340/707 |
| 4,456,925 | 6/1984 | Skerlos et al. | 358/85 |
| 4,479,142 | 10/1984 | Buschman et al. | 358/13 |
| 4,484,302 | 11/1984 | Cason et al. | 364/900 |
| 4,496,976 | 1/1985 | Swanson et al. | 358/147 |
| 4,563,162 | 1/1986 | Ishimoto | 446/454 |
| 4,563,626 | 1/1986 | Ohtake | 320/2 |
| 4,579,338 | 4/1986 | Heffron | 273/1 E |
| 4,589,138 | 5/1986 | Milner et al. | 381/110 |
| 4,599,644 | 7/1986 | Fischer | 358/84 |
| 4,602,227 | 10/1986 | Levin et al. | 333/109 |
| 4,602,279 | 7/1986 | Freeman | 358/86 |
| 4,608,601 | 8/1986 | Shreck et al. | 358/146 |
| 4,609,358 | 9/1986 | Sangster | 434/307 |
| 4,613,904 | 9/1986 | Lurie | 358/142 |
| 4,729,563 | 3/1988 | Yokoi | 273/DIG. 28 |

FOREIGN PATENT DOCUMENTS 948400 6/1974 Canada.

OTHER PUBLICATIONS

Correspondence, Leyden, 9/13/86.

Primary Examiner—James J. Groody
Assistant Examiner—Michael D. Parker
Attorney, Agent, or Firm—Kolisch, Hartwell & Dickinson

[57] ABSTRACT

Method and apparatus for in-band, video broadcasting of commands to interactive devices are described. Control data are encoded by subliminally modulating, prior to the remote, composite video broadcast of video program material, a selected sequence of video image fields. The resulting modulated video fields within the viewing area of a television, each having alternately, proportionately raised and lowered luminance horizontal scan lines, are monitored by a light sensitive device positioned adjacent the user's television screen. A semi-rigid, twisted pair cable connects the device to nearby receiver/transmitter electronics that discriminate the binary data from the program material and amplitude modulate a high frequency infrared (IR) carrier with the data. Interactive devices, e.g. educational aids or action toys, within range of the wireless IR transmission detect energy in this frequency range, decode the commands embedded in the control data, and selectively execute predetermined actions in response to the data-encoded broadcast. In a proposed modification, low radio frequency (RF) electromagnetic radiation emanating from the television's raster scan electronics is coupled by a conventional RF antenna to the receiver electronics, which identically discriminate the binary data, from the program material, for transmission to the interactive devices.

52 Claims, 5 Drawing Sheets

INTERACTIVE VIDEO METHOD AND APPARATUS

BACKGROUND OF THE INVENTION

This invention relates generally to interactive educational and entertainment systems, and more particularly to method and apparatus for data encoding a video signal at a remote broadcast site, decoding the signal at a reception site, and locally transmitting the data to control one or more interactive devices. The preferred embodiment of the invention is described in the context of television program control of toys located in a television viewer's home.

Videotext systems are known to be able to provide data communication from a remote video broadcast site to home television viewers over conventional broadcast channels. One such videotext system provides closed captioning of audio program material for the hearing-impaired, wherein the interpretive text is transmitted during vertical synchronization intervals of the raster scan process. Only televisions that are specially equipped with decoders are able to display the captions, and the displaying of video text in synchronization with the television's raster scan electronics requires the physical interconnection of the decoder and the television, e.g. an antenna hookup. Frequently, the payment of a subscription fee is required.

Attempts to provide systems capable of generalized, in-band data communications have met only marginal success. This is because conventional in-band signaling is disruptive of the television's video image. For example, when data and pixel information are mixed in the same video field or frame, they are spatially separated to enable a light sensitive detector unobtrusively to monitor the data-encoded subfield. Typically, this spatial separation is achieved by defining one or more cells, each of which is first blanked and then reprogrammed with high and low luminance regions representing binary coded data.

Depending upon the size, number and coding of such data cells, the effective viewing area of the video program material is more or less adversely impacted. Such video data communications systems do not lend themselves to conventional broadcast channels, where subscribing and nonsubscribing television receivers alike will display the composite pixel and data information. Visual clutter that is visible on the television screens of nonsubscribers, or on the screens of subscribers who are not using their light sensitive detector at the time, likely will result in consumer complaints and FCC restrictions.

It is desirable to provide an interactive video system capable of simplex data communications that is raster time-base error tolerant, and that requires no electrical connections to the television set. Such a system should be capable of communicating at a rate sufficient to control an interactive electromechanical device, e.g. an action toy, in real time response to the video program's story line. The system preferably would be compatible with conventional television broadcast, reception and recording equipment and channels. Reception equipment should impose little or no setup time and difficulty, and should be unobtrusive, even while in use. Perhaps most importantly, the system should not unduly burden or distract those viewers who are not using the interactive feature.

Accordingly, it is a principal object of the present invention to provide a video system that enables a remote video broadcast wirelessly to interact with a purchasable educational or entertainment device. Other important objects of the invention include the following:

(1) to provide an interactive video system that is compatible with conventional broadcast equipment and channels, and with conventional television receiving, recording and playback systems, including restricted bandwidth home recording and playback systems;

(2) to provide a system, as described, that minimizes video and audio interference with program material;

(3) to provide a method for subliminally encoding binary data, within the viewing area of a video program image, that is substantially invisible to a viewer of the television;

(4) to provide an interactive video system that easily and unobtrusively may be installed and operated;

(5) to provide interactive video educational and entertainment apparatus that permits the user to interact with a television program in real time;

(6) to provide a method for subliminally, digitally encoding data with a pre-recorded video broadcast;

(7) to provide a method for simplifying the decoder by substantially invisibly removing spurious data from the video input to the encoding apparatus prior to data encoding;

(8) to provide interactive video apparatus that requires no electrical connection to the television and that communicates with one or more purchasable, educational or entertainment devices; and (9) to provide an interactive video system that is convenient, reliable and inexpensive to use.

SUMMARY OF THE INVENTION

Method and apparatus are described that permit the remote control of interactive devices proximate to a conventional television receiver by the broadcast of composite video information thereto. The method consists of producing a composite video signal containing program material and control data by subliminal luminance and/or chrominance modulation; broadcasting the signal to a television; receiving the signal by the television; detecting the modulation, at the television, to reproduce the control data; and locally transmitting the control data to enable entertainment, educational or other devices within range of the transmission to respond to the program material in a predetermined manner. The remote control apparatus includes means for generating a signal containing control data; means for generating a signal containing a video program; means for modulating the video program signal by the control data signal in timed relation thereto, thereby producing a control data-modulated video subcarrier detectable as modulation in at least one predefined viewing area of the television; means at the television for detecting such modulation in the viewing area to produce a control data sequence; and means for controlling, in predetermined response to the control data sequence, the actions of at least one entertainment, educational or other device.

The data encoding method of the invention involves modulating a video signal at frequencies that are related to multiples and submultiples of the horizontal line rate, to produce a subtle video subcarrier. Although the modulation is within the viewing area of the television screen, it remains substantially invisible to the viewer because of its relatively low intensity, its timed relation to the horizontal line rate and the inherent integration and resolution characteristics of the human eye. In order to ensure the integrity of the data communication, while limiting the cost to users of the decoding apparatus, the signal-to-noise ratio of the communication is increased, in the preferred embodiment of the invention, by the data encoder's removal of subcarrier components interpretable as data when a binary 0 is to be encoded, and by the addition of a subcarrier when a binary 1 is to be encoded (or vice versa). Those skilled in the art will appreciate that one or more such subcarriers may be data modulated to convey information, in serial or parallel, in a variety of ways, including, but not limited to, pulse modulation (PM), phase modulation (PM), amplitude modulation (AM), frequency modulation (FM), time or pulse interval modulation (PIM), frequency shift keying (FSK), return-to-zero (RZ), non-return-to-zero (NRZ), or any other of a variety of spatio-temporal modulation and coding techniques.

In its preferred embodiment, the interactive video apparatus takes the form of an optical transducer, or light sensitive diode, that may be 'aimed' at the television screen and that is connected via a twisted pair cable to a compact, battery-powered receiver/transmitter device located nearby. Receiver electronics reconstruct the control data by detecting the video subcarrier in the modulated video image and producing a bit-serial signal representing the control data. Transmitter electronics amplitude modulate an infrared (IR) carrier by the reconstructed control data and drive an infrared light emitting diode (IRED) array. One or more interactive toys, which may be separately purchased, detect the carrier, decode the command field within the control data, and initiate one or more actions in response thereto.

In a proposed modification to the preferred embodiment, an antenna capable of intercepting radio frequency (RF) electromagnetic radiation and coupling it to conventional receiver electronics replaces the optical transducer and twisted pair cable of the preferred embodiment. It has been found that an inaudible, but detectable, low RF artifact of the data modulated video subcarrier is produced by the raster scan electronics of a television which is displaying the composite video signal described herein. While being of somewhat more limited range, i.e. the antenna must be located within a few feet of, and in front of, the television screen, due to the relatively low energy level of the RF emanations, this alternative embodiment also yields certain advantages: the antenna may be located closer to the screen of the television, as it needs no field of view; and the antenna is less susceptible to interference from spurious, visible light sources, e.g. the high frequency emanations of a fluorescent lamp.

Thus, the various objects of the invention are achieved. Subliminal luminance modulation within a viewing area of the television enables data encoded therein to be detected, while the modulation remains invisible to a television viewer. The optical transducer, which may be 'aimed' unobtrusively at the television screen from a range of distances and through a range of angles, semirigidly extends from the receiver/transmitter device, which may be affixed discretely to the side of the television receiver, thereby obviating conventionally required interconnections. The detector, or decoder is simplified and the data communication rendered more reliable by the data encoder's removal, prior to broadcast, of video features that otherwise would be interpretable as data. Infrared transmission between the receiver/transmitter device and interactive devices located in the room is wireless and inaudible, and imposes no burden on users or non-users of the interactive video apparatus. The encoding of selective successive fields of the video image with a serial bit stream of binary data achieves a data rate adequate to permit real time control, within or outside the context of the video program material, of multiple interactive devices. Parity error detection logic within the interactive devices controlled thereby ensures data integrity so that the interactive devices reliably respond in a predefined manner. The electronics of the apparatus use conventional logic circuitry and fabrication methods, including very large scale integration (VLSI), thereby further enhancing the reliability of the system and reducing its cost.

These and other objects and advantages of the present invention more clearly will be understood from consideration of the drawings and the following description of the preferred embodiment.

DETAILED DESCRIPTION OF THE PREFERRED EMBODIMENT

Figure 1:
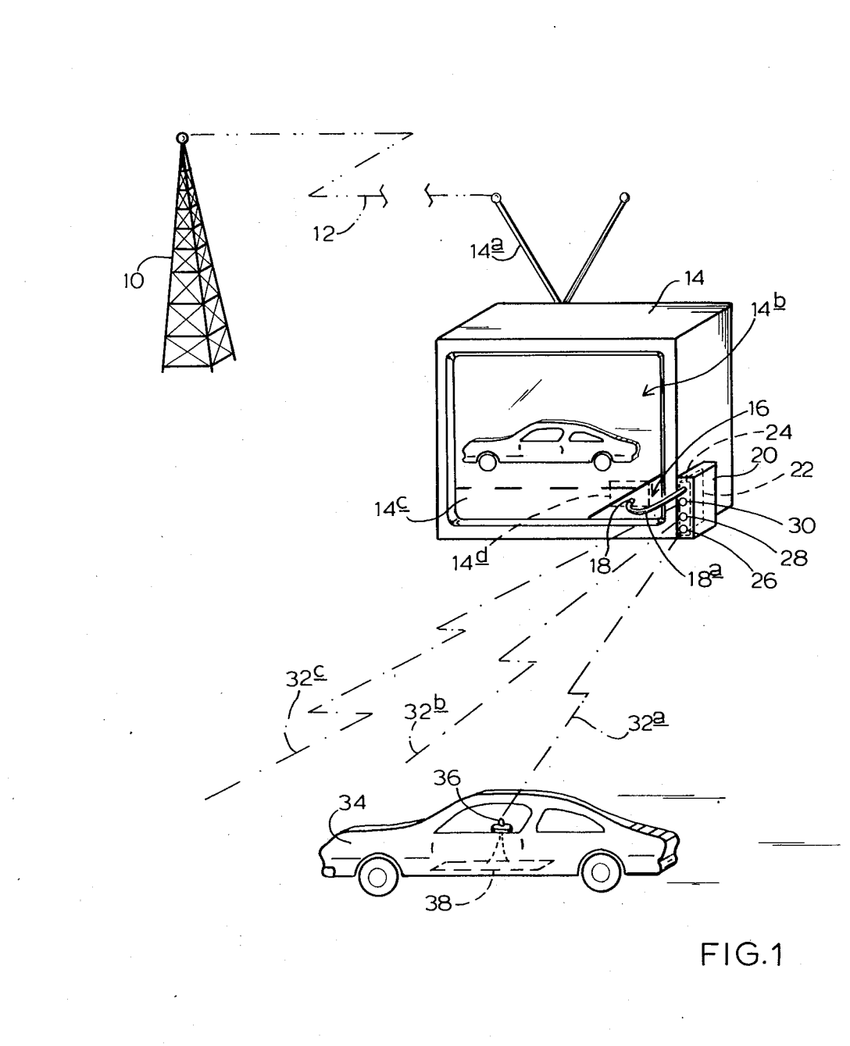
FIG. 1 shows the use of an interactive toy system made in accordance with the preferred embodiment of the invention.
Figure 2:
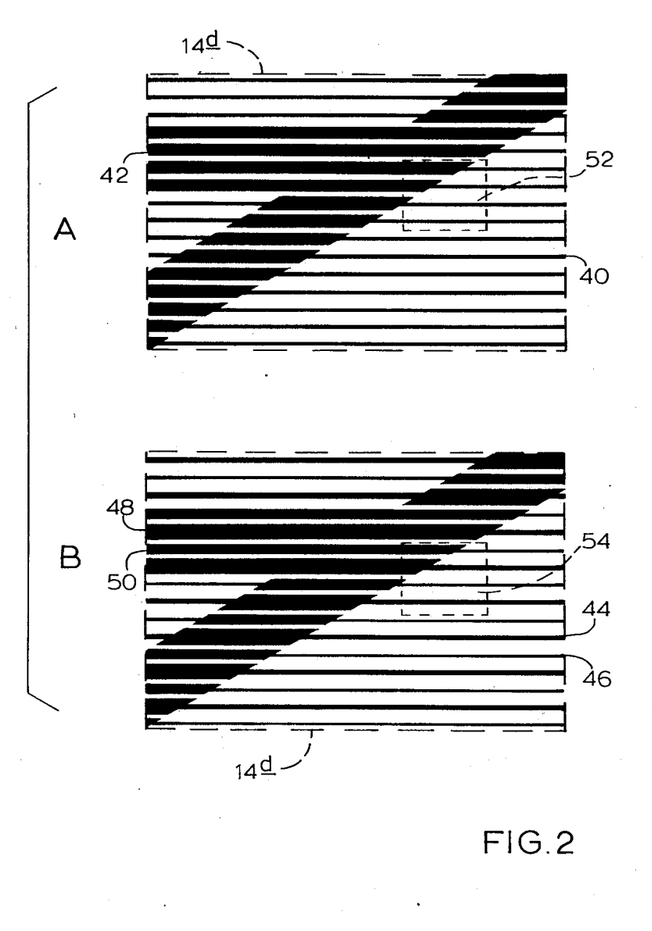
FIG. 2 schematically illustrates the novel luminance modulation method of the invention.

FIG. 1 is a pictorial representation of the use of the interactive video apparatus of the present invention. A remote television broadcast antenna 10 is shown broadcasting composite video information, or a composite video signal that contains video program material and control data, indicated by dash-dot-dot line 12, to a television 14. Antenna 14a of television 14 picks up the remote broadcast and displays it on the screen, indicated generally at 14b. For the purposes of this discussion, screen 14b may be thought of as having a program viewing area 14c, which generally is coextensive with screen 14b, that includes representative area 14d, which will be used in reference to FIG. 2 schematically to illustrate the novel data encoding method of the invention. For illustration purposes only, and so that it will be appreciated how the interactive video apparatus may be used with entertainment devices, the video image of a car speeding past an intersection is shown as the prominent feature of the television program being displayed.

An optical transducer 16, having a light sensitive diode 18 on one end of a semirigid, twisted pair cable 18a, may be 'aimed' at viewing area 14c from a distance, preferably greater than six inches, and at an angle, preferably greater than thirty degrees. In the preferred embodiment, cable 18a is rigidized by integrally molding cable 18a with a stiff wire, using a suitable, elastomeric compound. Thus, once transducer 16 is positioned to point at viewing area 14c, its position is maintained thereafter until repositioned by the user. The other end of transducer 16 is connected to a translator, or receiver/transmitter device 20, which may be located adjacent television 14, e.g. atop or therebeside, and which may be affixed, for example, by the use of loop-and-pile textile (not shown). Transducer 16 couples luminance modulation within its view to detecting means (not shown in FIG. 1, but shown in FIG. 3 and described in reference thereto) within receiver/transmitter device 20. Device 20 includes receiver/transmitter electronics mounted on a circuit board 22, and a front panel 24. IREDs 26, 28, 30 are mounted to printed circuit board 22, and extend to a position along front panel 24, enabling them to emit infrared energy generally in the direction shown by dash-dot lines 32a, 32b, 32c. It will be appreciated that any desirable number of IREDs may be used, depending upon the current capacity of the drive electronics and the desired transmission range.

An interactive device, such as car 34, within range of IREDs 26, 28, 30, contains light responsive means, or light sensitive diode 36 mounted on a printed circuit board 38 within car 34. In a manner that will be described below, binary data may be encoded in viewing area 14c which data, although invisible to a viewer of the television, nevertheless is detectable by receiver/transmitter device 20 by the coupling of luminance modulation within viewing area 14c via transducer 16 Receiver/transmitter electronics within device 20 reconstruct the control data from the luminance modulation, and transmit it to car 34. Car 34, responsive to a command embedded in the control data, initiates a predefined action. In the illustration, car 34 imitates the display activity, or mimics the action of the car in the television program by starting its motor and accelerating.

It will be appreciated that the interactive device may be any educational or entertainment device or the like capable of responding in a prescribed manner to control data that is transmitted as infrared energy within a proper frequency range. The potential uses for the interactive video apparatus described herein are virtually limitless. It also will be appreciated that the source of the composite video signal containing video program material and control data need not be remote broadcast antenna 10, as illustrated in FIG. 1, but rather may be a videocassette player conventionally connected to television 14 and either playing a pre-recorded videocassette tape or receiving such a remote broadcast for local display on television 14 or other video monitor.

In a proposed modification to the preferred embodiment of the invention, transducer 16 takes the form of any of a variety of conventional RF antennas capable of coupling low RF electromagnetic radiation emanating from television screen 14b to receiver/transmitter device 20. In the interest of illustrative brevity and clarity, FIG. 1 may be interpreted as showing this alternative embodiment, with the only difference being that light sensitive diode 18 and twisted pair cable 18a straightforwardly are replaced by a rigid conductor, similarly located and similarly oriented, which may be dimensioned and shaped, as is well-known, to provide adequate RF sensitivity. Whereas light sensitive diode 18 of the preferred embodiment may be located a substantial distance from television screen 14b, but preferably greater than six inches therefrom, the effective range of the antenna of the proposed modification is both smaller and closer, i.e. the antenna preferably is located within a few feet of, but not in contact with, the television screen.

Turning next to FIG. 2, the novel method of encoding data within viewing area 14c of FIG. 1 schematically is illustrated. Detail A shows representative area 14d in the absence of brightness modulation; detail B shows, in substantially exaggerated form, representative area 14d in the presence of luminance modulation. For the sake of clarity and subject to graphic arts constraints, details A and B are shown with greatly exaggerated vertical spatial separation between horizontal scan lines, and with greatly exaggerated luminance modulation. Nevertheless, the illustrations are deemed instructive of the novel luminance modulation method proposed herein.

In detail A, relatively low luminance horizontal scan lines are represented by lines such as line 40. Relatively high luminance horizontal scan line segments are represented by relatively wider lines, such as line 42. In this way, high luminance features, such as those shown within area 14d of FIG. 1, contrast with the nominal luminance background areas of the moving picture frame captured illustratively in FIGS. 1 and 2. It will be appreciated that the line widths chosen for illustration purposes are representational only, and generally do not represent the actual scan line widths or spacings visible at this scale within viewing area 14c. It will be understood, in reference to FIG. 2, that the horizontal lines of details A and B are non-interlaced, and represent the lines in a single field, rather than a line-interlaced frame. By modulating alternate lines within consecutive fields, data may be encoded for transfer at the television's field rate, e.g. 60 Hz in the case of National Television System Committee (NTSC) television broadcast.

Detail B illustrates the effect, within area 14d, of luminance modulating viewing area 14c, as depicted in detail A. By alternately raising and lowering the luminance of adjacent horizontal scan lines within viewing area 14c, a video subcarrier is produced that is detectable by opto-electronic means, while the spatial relationship among picture elements within viewing area 14c, the luminance across viewing area 14c and the contrast between relatively high and relatively low luminance features within viewing area 14c are preserved. Thus, the background now contains alternately raised and lowered luminance horizontal scan lines 44 and 46, respectively. That is, raised luminance lines, represented by line 44, are at a luminance level slightly higher than that of line 40 of detail A, and, complementarily, alternate lines, represented by line 46, are at a somewhat lower luminance level compared to corresponding lines 40 of detail A. Corresponding to relatively high luminance feature lines 42 of detail A are raised luminance lines, such as 48, and lowered luminance lines, such as 50.

As represented in FIG. 2, the luminance modulation, which enables the detector, to be described below, to detect and decode the binary data encoded by the preferred method of the invention, results in the alternate raising and lowering of the luminance levels of the horizontal lines shown in detail A. Although this modulation is exaggerated in detail B (and represented by line width, rather than line intensity, modulation), for illustrative purposes, it is apparent from details A and B that the overall average luminance of, and contrast between, the video features and the background within viewing area 14c are preserved.

Focusing attention now on areas 52, 54 of FIG. 2, it will be appreciated that, even in the presence of luminance modulation wherein a binary 0 or 1 may be coded, the spatial relationship among picture elements within an arbitrarily small region of viewing area 14c is preserved. For example, even if areas 52, 54 were reduced to embrace only two adjacent horizontal scan lines of viewing area 14c, the overall luminance within region 54 would be the same as that within corresponding region 52. This is by virtue of the novel, alternate line, proportionate modulation scheme of the present invention, wherein the percentage by which one line's luminance is raised is equal to the percentage by which an adjacent line's luminance is lowered. Those skilled in the art will understand that the same method may be applied to the chrominance signal to produce a detectable, but subliminal, data modulated chrominance subcarrier.

Importantly, horizontal scan lines within a field of the true video image, represented only schematically in FIG. 2, are closely spaced, so that any coarseness resulting from alternate line luminance modulation is substantially invisible to the viewer of television 14. In the practice of the preferred method of the invention, the peak-to-peak percentage modulation that, although virtually invisible to the viewer, nevertheless is detectable by opto-electronic means, is approximately 10 percent, or less than one half of the apparent modulation illustrated schematically herein.

It will be appreciated that the alternate line, proportionate modulation scheme described immediately above is only one of many subliminal, data encoding methods within the scope of the invention. Obviously, adjacent pairs, triplets, etc. of horizontal lines alternately may be proportionately luminance modulated, while still preserving the overall luminance of, and contrast between, the video features and the background within viewing area 14c. As will be described, in reference to FIGS. 3 and 5, corresponding changes to the period and frequency of various filters and delay lines are all that would be required to accommodate such a modification to the modulation scheme. It also will be appreciated that subliminal modulation within viewing area 14c of television 14 may be performed in such manner that multiple subcarriers simultaneously are present therein. In this way, more than one binary bit of data may be conveyed to, and detected by, transducer 16 within a single video field to achieve a data rate that is greater than the television's field rate. Higher data rates also may be achieved by the division of viewing area 14c into multiple regions, each of which is subliminally modulated to encode one or more binary bits of data. Multiple transducers, such as transducer 16, may be 'aimed' within the separate regions and a decoder circuit, responsive to the transducers, may detect and decode the binary data presented in parallel to television 14.

Figure 3:
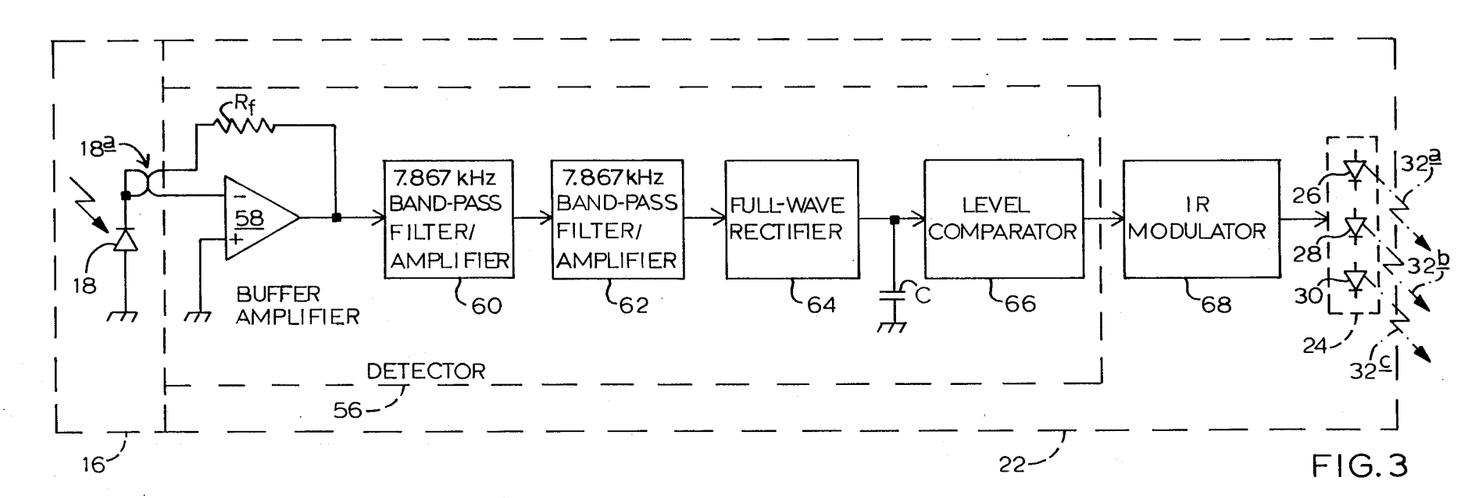
FIG. 3 schematically illustrates, in block diagram form, the video receiver/IR transmitter electronics of the interactive apparatus.

Turning next to FIG. 3, a block diagram of the receiver/transmitter electronics capable of detecting, decoding, and transmitting binary coded data from television 14 to interactive toy 34 is described. Detecting means includes transducer 16 which is 'aimed' at screen 14b; light sensitive means, such as diode 18, which optically couples luminance within its view, via cable 18a, to a detector, or receiver electronics; and receiver electronics 56, which produce a control data sequence for the control of an interactive device. Receiver electronics 56 analyze the electrical signal for energy within a range around 7.867 kHz, which is one half of the NTSC nominal (color) horizontal line frequency within a field, and is, therefore, the frequency at which luminance is modulated in viewing area 14c of the television screen. In the presence of luminance modulation within this range of frequencies, the output of receiver electronics 56 represents a binary 1 or 0, indicating the presence and sense of control data intended for ancillary use by, e.g. an interactive device.

Receiver electronics 56 include amplifier 58, the gain of which is determined by feedback resister $R_f$, the value of which may be determined by well-known methods; dual, series band-pass filter/amplifiers 60, 62, both tuned to pass, and somewhat amplify, energy in a range about 7.867 kHz and each having a selectivity, or Q, of approximately 10; full-wave rectifier 64, the output of which is smoothed by capacitor C; and level comparator 66, which compares the smoothed output of rectifier 64 with a predefined reference voltage to determine whether the 7.867 kHz energy is, in fact, encoded data, rather than incidental, video noise. It will be appreciated that filter/amplifiers 60, 62 may be combined into a single stage amplifier yielding similar gain and selectivity.

Level comparator 66, which may be thought of as being of high gain, but limited dynamic range, compares the smoothed output of rectifier 64 preferably for a period of time greater than the period of several horizontal lines, thereby ensuring against a false indication of the presence of encoded data within a field that happens to have adjacent horizontal lines of different luminance, e.g. a horizontal boundary between high and low luminance features of a video image. In the preferred embodiment, the time period over which comparator 66 is active is approximately equal to the time it takes the raster scan electronics of television 14 to traverse fifteen horizontal lines. The output of comparator 66 is bistable, having a first, active state during an interval of time, preferably greater than one millisecond (corresponding to the presence of luminance modulation), and having a second, inactive, state at all other times. Thus, detecting means produces a control data sequence by the continuous monitoring of luminance modulation within viewing area 14c of television 14.

It will be appreciated that band-pass filter/amplifiers 60, 62 may be centered on frequencies other than 7.867 kHz, to correspond with the luminance modulation frequency at which data is encoded. It also will be appreciated that multiple detecting means may be provided, within the spirit of the invention, wherein each is capable of detecting luminance modulation within distinct frequency ranges representing multiple, binary data bits.

Referring still to FIG. 3, it is seen that means for wirelessly communicating the control data to an interactive device includes an IR modulator 68, which modulates a 32 kHz carrier by the bistable output of comparator 66, and drives an IRED array consisting, in the preferred embodiment, of three IREDs 26, 28, 30. IREDs 26, 28, 30 are mounted to printed circuit board 22 and supported by front panel 24 (refer to FIG. 1), and emit IR energy generally in the direction shown by dash-dot lines 32a, 32b, 32c, thereby projecting, into a projection filed, encoded light-borne information derived from such control data. It will be appreciated that the carrier may be of any frequency, but is preferably of a frequency above the audible range to avoid undesirable acoustic coupling, and is preferably distinct from the carrier frequencies of other devices, e.g. the remote control device that wirelessly operates the television.

It will be appreciated that the receiver/transmitter electronics shown in FIG. 3 require no synchronization with the raster scan timing of television 14. They require no electrical connection whatsoever to television 14 or antenna 14a. It will be appreciated further that the receiver/transmitter electronics of device 20 are, in the preferred embodiment, battery-powered, thereby eliminating the necessity of supplying AC power thereto. The mere presence of subliminal luminance modulation of the proper frequency anywhere within viewing area 14c, coupled by transducer 16 to receiver electronics 56, enables the electronics within device 20 to discriminate control data from random video patterns. Thus, the invention enables subliminal, in-band data communication at a data rate greater than, equal to or less than the field rate of a conventional television, without the necessity of internal or external hookups.

It will be understood by those skilled in the art that when an antenna, rather than a light sensitive diode, is used to couple the data-modulated video subcarrier to receiver/transmitter 20, in accordance with a proposed modification to the preferred embodiment of the invention, receiver electronics 56 need be changed only to the extent that the input to buffer amplifier 58 will be the signal received by the antenna, rather than that produced by light sensitive diode 18, and minor adjustments desirably may be made, as is well-known, to the gain and selectivity of filter/amplifiers 60, 62 and/or the reference voltage of level comparator 66.

Figure 4:
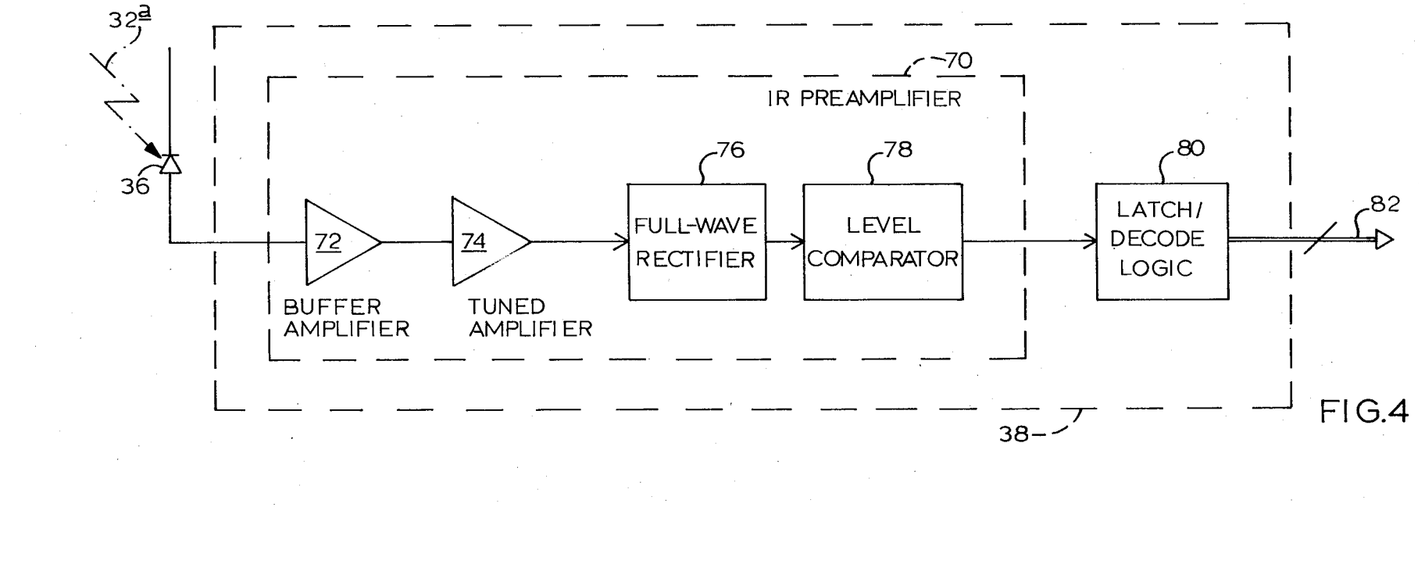
FIG. 4 schematically illustrates, in block diagram form, the receiver electronics of an interactive toy.

Turning now to FIG. 4, receiver electronics within an interactive toy, such as car 34, are illustrated. Projected information in the form of IR energy, such as that shown by dash-dot line 32a, is shown incident upon a receiver adapted to receive such projected information when within such field. In the receiver, which includes light responsive means and carrier detecting means, selectively IR light responsive means including light sensitive diode 36 produces a signal that is routed to carrier detecting means, or a conventional IR preamplifier circuit of the type commonly found in wireless, remotely controllable televisions. Generally, IR preamplifier 70 includes a buffer amplifier 72, an amplifier 74 tuned to the carrier frequency of IR modulator 68, a full-wave rectifier 76 and a level comparator 78. Preamplifier 70 transforms amplitude modulated, 32 kHz IR energy 32a that is incident upon light sensitive diode 36 into a demodulated, digital signal This digital signal represents the bit-serial data that was detected as luminance modulation at television 14, in what will be understood to be an RZ, binary-coded format. In other words, the binary 1s and 0s representing the data are separated in time by null, or inactive periods, during which the level of the digital output of comparator 78 would be, by high-true convention, a logic 0.

In the preferred embodiment, control data that are encoded by luminance modulation for broadcast to television 14 are formatted in an asynchronous, or start/stop, protocol. In this well-known format, which is compatible with conventional universal asynchronous receiver/transmitter (UART) chips and communications line monitoring and data logging equipment, data may be represented by a five- to eight- bit code preceded by a start bit, optionally succeeded by a parity bit and succeeded by a stop bit. Although in the preferred embodiment of the invention the data field is five bits long and a parity bit is used to ensure data integrity, it will be appreciated that any predetermined number and arrangement of bits within the control data may be used.

It also will be appreciated that, within the data field representing command/address information intended to activate an interactive device, the command/address information may be encoded in a variety of ways. In the preferred embodiment, the first three of the five data bits are always a binary 1, and the remaining two bits are reserved to convey predefined command information to an interactive device in a manner that will be described.

The digital output of comparator 78, which represents an RZ, binary-coded, control data sequence, is latched, validated and decoded by latch/decode logic 80, which is clocked at the data rate, e.g. 60 Hz. As consecutive bits, including a start bit, a parity bit and a stop bit of predefined logic levels, are clocked into a controller, or latch/decode logic 80, the control data field is validated as containing command/address information. When they have been validated as being properly framed by a start and stop bit and as being of correct parity, the five bits of command/address information, or information-related control, signals are enabled onto bus 82, which is routed to various activity-producing means (not shown), e.g. a motor within an interactive device, such as car 34.

It will be understood that latch/decode logic 80 may be implemented in any of a number of well-known digital logic circuits. For example, a shift register may be used to accumulate successive control data bits, and any of various clock recovery schemes may be used to define a signal the edge of which clocks successive bits of control data into the shift register. Or, for example, by inverting and stretching the output of comparator 78 to a duration of greater than one half of a bit time, e.g. by the use of a monostable multivibrator, a UART may be used to implement the latch/decode logic, by supplying a clock at a rate equal to 16 times the data rate. It will be appreciated that, by the use of a UART, binary data are automatically validated (as against parity and framing errors) and are latched for their parallel presentation onto data bus 82. In the preferred embodiment of the invention, latch/decode logic 80, as well as IR preamplifier 70 circuitry, is implemented in a custom VLSI chip, thereby substantially reducing the cost and increasing the reliability of car 34.

It will be appreciated that the address/command field of the control data may be of any length, and may be encoded in a number of ways, depending upon system requirements, e.g. how many interactive devices need be addressed and how many commands each need comprehend. Further, it will be appreciated that, by comparing the address field to one or more predefined values, particular interactive devices, within the user's home, having address responsive means selectively may initiate the action indicated by the command field when the address field and one or more such values are equal. For example, the address/command field may be assigned a mode control bit that determines how the remaining bits will be interpreted by an interactive device. In the case of a large number of relatively limited capacity interactive devices, most of the remaining bits may be reserved to address, and a relative few to command. In the case of fewer, more capable interactive devices, most of the remaining bits may be reserved to command, and a relative few to address. In this way, a flexible system may be designed in which interactive devices of varying number and capability are accommodated within an address/command field of any desirable length and respond only to preassigned, device-specific addresses.

A particular interactive device is, in the preferred embodiment, hard-wired to respond in a predetermined way to control data received thereby to generate data-related device activity, thus to coordinate device activity with display activity. It will be appreciated that it instead may be programmed, or read-only memory-(ROM-)controlled, so that the responses more readily may be changed. The actions initiated by one or more interactive devices might include motor; steering; headlight; siren; speech synthesis; or numerous others. In the case of an interactive device that is not an action toy, successive command fields may represent, for example, American Standard Code for Information Interchange (ASCII) text that may be displayed on a lap-top display device, or Musical Instrument Digital Interface (MIDI) data that may be used to control a musical instrument. Thus, the particular application illustrated in FIG. 1, wherein the interactive device is toy car 34, is merely one of numerous uses of the novel interactive video apparatus of the present invention.

Figure 5A:
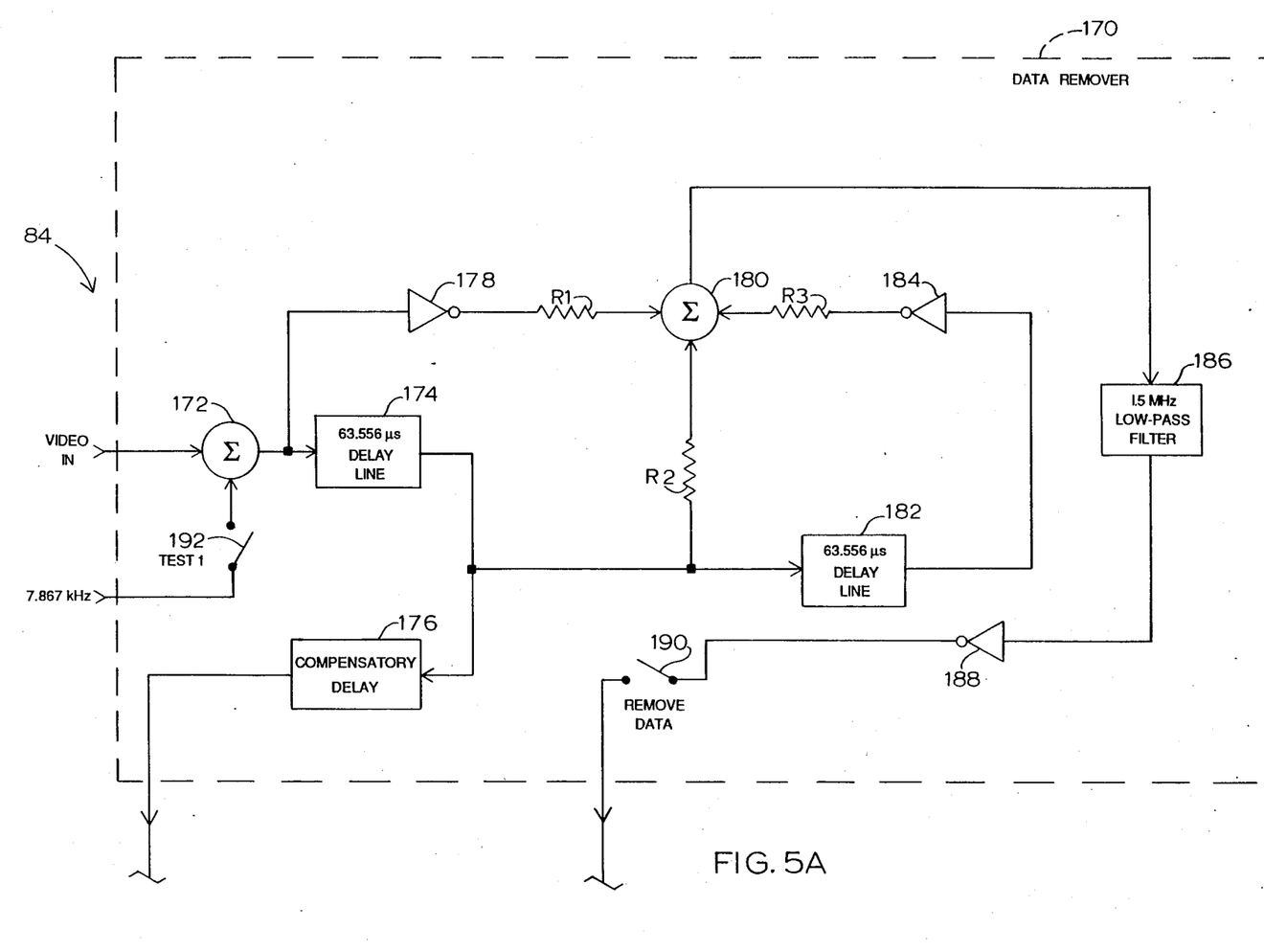
FIG. 5 schematically illustrates, in block diagram form, the video encoding electronics of the invention.
Figure 5B:
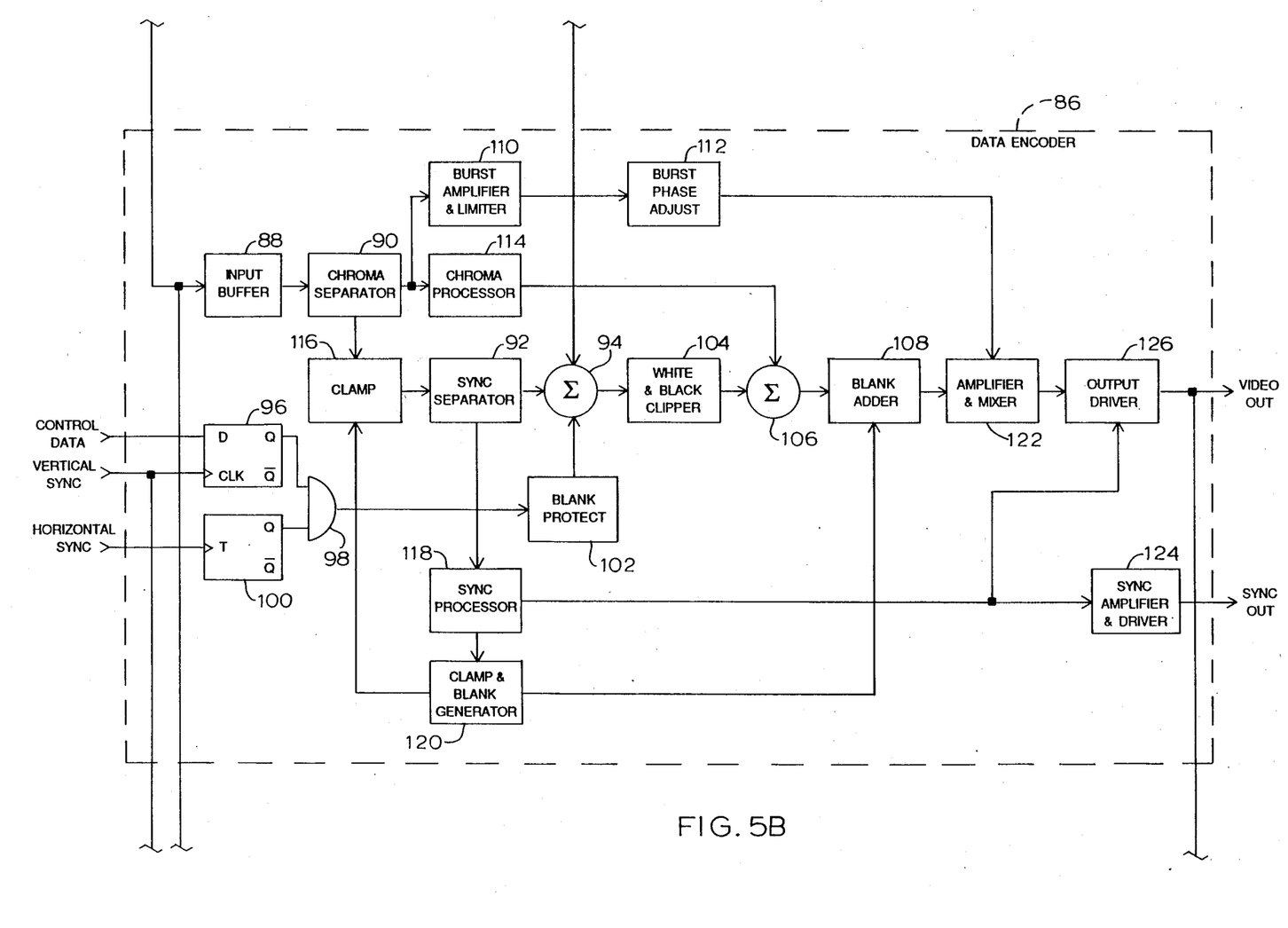
Figure 5C:
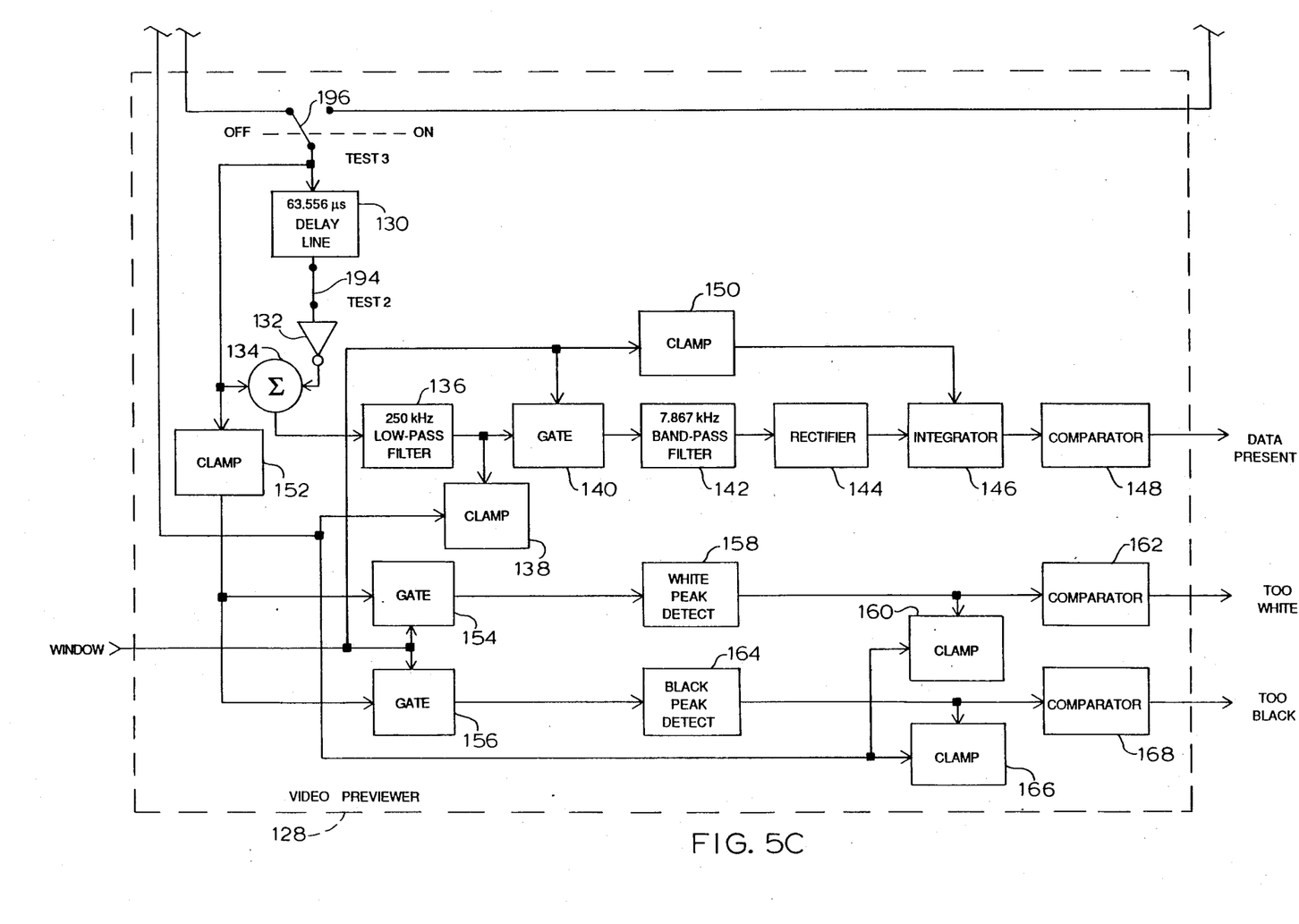

Turning finally to FIG. 5, the preferred embodiment of the encoding electronics used to produce a data-encoded, composite video signal for remote broadcast, illustrated in block diagram form, is indicated generally at 84. Encoding electronics 84 best will be understood as a modification to what is known as a video processing amplifier, commonly used in the context of video broadcasting to ensure that videotapes conform to broadcast quality, format and other regulatory requirements. First, those portions of the diagram which relate to the production of a composite video signal containing video program material and control data will be described. Second, a video preview circuit will be described that enables a videotape to be viewed, prior to data encoding, to determine the suitability of the program material for luminance modulation. Finally, a data remove circuit, which permits a previously data-encoded videotape to be restored to its pre-encoded condition, will be described.

Indicated at 86 are the functional blocks that, in the preferred embodiment of the invention, implement the luminance modulation, data encoding scheme. Data encoder 86 includes an input buffer 88 into which means (not shown) for generating a program signal feed video program material. A chroma separator 90 extracts the chrominance component of the conventional color-composite signal, while sync separator 92 extracts the synchronization component therefrom, allowing only the luminescence component to reach video/data mixer 94. The only other input to mixer 94 (with the REMOVE DATA switch open) is the control data to be mixed with the video program material.

Means for generating a data signal, e.g. computer means (not shown), present control data bit-serially to the D input of a flip-flop 96, where the logic level, representing a 1 or a 0 to be encoded for broadcasting, is synchronized with the VERTICAL SYNC signal having a frequency equal to the field rate. The synchronized output of flip flop 96 is ANDed at 98 with the 50% duty cycle output of a flip-flop 100 the toggle input of which is the HORIZONTAL SYNC signal. A blanking protection, or blank protect circuit 102 level clamps the output of AND gate 98 to ensure that the normal video synchronizing signals, HORIZONTAL SYNC, VERTICAL SYNC and chroma reference, which are transmitted during the blanking intervals, are not disturbed by data modulation. Circuit 102 also biases the output of AND gate 98 to have approximately equal positive and negative excursions, in order to provide proportionately raised and lowered luminance when the control datum is a binary 1, and to make no contribution to the luminance output of mixer 94 when the control datum is a binary 0.

A 'white' and 'black' clipper circuit 104 ensures that, after the mixing of program material and control data in mixer 94, maximum 'white' and minimum 'black' levels are not exceeded. A second mixer 106 recombines the chrominance and luminescence signals, producing a signal that is blanked, during horizontal retrace, in blank adder 108.

Referring still to data encoder 86, circuitry is illustrated the operation of which is well-understood by those skilled in the art including: burst amplifier 110; burst phase adjust 112; chroma processor 114; clamp 116; sync processor 118; clamp and blank generator 120; final stage amplifier and mixer 122; sync amplifier and driver 124, which produces a signal called SYNC OUT; and output driver 126, which provides the VIDEO OUT signal. Thus, data encoder 86 provides means for modulating the program signal by the data signal in timed relation thereto, thereby producing a control data subcarrier.

Referring still to FIG. 5, a video previewer, indicated at 128, is described in detail. The purpose of previewer 128 is to provide a method of previewing video program material, field by field, for its suitability in the luminance modulation, data encoding scheme of the preferred method. Previewer 128 permits the identification of a sequence of consecutive video fields each of which contains, in the window circumscribing the viewing area to be encoded, high and low luminance respectively below and above a corresponding threshold level. Similarly, previewer 128 permits a videotape containing the 7.867 kHz video subcarrier to be identified as either already having been data-encoded or as containing video features which would be detected as encoded data when, in fact, they are not. By well-known field tagging techniques, fields that are either too 'white' or too 'black' effectively to be luminance modulated, or fields containing video features that would appear to be data, may be identified by their time code sequence numbers and may be excluded as candidates for data encoding. Those skilled in the art will appreciate that the addition of an appropriate video delay between previewer 128 and encoder 86, i.e. a delay longer than the predefined control data word length, would permit videotapes to be previewed, tagged and data encoded in a single pass or playback period.

By reference to video previewer 128, it first will be seen that video program material is delayed, in the preferred embodiment, by one horizontal line through an ultrasonic delay line 130. The resulting signal is then inverted through analog inverter 132 (assuming that the TEST 2 switch is closed), and mixed with an undelayed version of the same program material signal in adjustable phase mixer 134, in what may be thought of as a double-line correlator. A 250 kHz, low-pass filter 136 removes undesirable, high-frequency artifacts of horizontal delay line 130. The output of filter 136 is clamped at 138 (while VERTICAL SYNC is active) and sampled, during the traversal of the windowed portion of the field being analyzed, as this is the only time of particular interest. A 7.867 kHz band-pass filter 142, a full-wave rectifier 144, an integrator 146 and a reference voltage comparator 148 produce a binary signal, DATA PRESENT, when the windowed field being analyzed contains what appears to be encoded data.

It will be understood that WINDOW, which defines the perimeter of an included subfield of the viewing area in which video program material and control data will be mixed, is used to switch gate 140 and, via clamp 150, to define the period over which the subcarrier is integrated. It will be understood that WINDOW may be produced by a combination of horizontal sync, vertical sync and a pattern generator (not shown), which may be defined by a programmable read-only memory (PROM) or other microcontrol device (not shown). Notwithstanding the fact that, in the preferred embodiment, the subfield circumscribed by WINDOW is the entire viewing area 14c of television 14, it will be appreciated that a proper subfield—of lesser area than viewing area 14c—may be defined, within the spirit of the invention, and its boundaries blended, by use of a ramp generator, to avoid a perceptible difference between the unmodulated and modulated regions of viewing area 14c at the interface therebetween. It will be appreciated that the luminance modulated subfield need not be rectangular, or of any fixed shape, but rather may be amorphously defined under the pseudorandom control of a pattern generator. Importantly, the preferred method and embodiment of the invention avoid the boundary problem by luminance modulating the entire viewing area 14c of television 14.

The video program material signal is clamped at 152 and, via gates 154, 156, is sampled for the duration of the WINDOW signal. The output of gate 154 is peak detected at 158, clamped at 160 (while VERTICAL SYNC is active) and compared at 162 to a predetermined 'white' luminance maximum, thereby producing a signal, TOO WHITE, that indicates whether the luminance within the subfield is too high detectably to be luminance modulated with data. Complementarily, the output of gate 156 is peak detected at 164, clamped at 166 (while VERTICAL SYNC is active) and compared at 168 to a predetermined 'black' luminance minimum to produce a signal, TOO BLACK, that indicates whether the luminance within the subfield is too low detectably to be luminance modulated. It will be understood that TOO WHITE, TOO BLACK may be monitored by computer means (not shown) to tag the corresponding subfield as being either of too high or too low a luminance. During the data encoding process, such fields may be avoided, and a more suitable, but equally timely, sequence of fields may be encoded with control data. In an alternative embodiment, such fields might be rendered suitable, rather than avoided, by computer means, e.g. by modifying video levels such as gain and pedestal.

Delay line 130, which in the preferred embodiment imposes approximately a 63.556 µs delay, which is the NTSC nominal horizontal line period, permits the inverse of the instantaneous luminance of the previous horizontal line to be added to the instantaneous luminance of the present line, in mixer 134, producing thereby an instantaneous luminance difference between the two adjacent lines. In the presence of luminance modulation at or about the 7.867 kHz frequency, the signal representing this difference will contain a substantial subcarrier component that may be detected at the output of comparator 148. It will be appreciated that the data present circuit of video previewer 128 is similar in many respects to receiver electronics 56, illustrated in FIG. 3, in that it seeks to detect a threshold video energy level at one half of the NTSC horizontal line frequency. It also will be appreciated that video delay line 130 may be implemented in alternative devices, e.g. charge-coupled device (CCD) shift registers.

Referring still to FIG. 5, it is noted that a data remover is indicated at 170. Generally, data remover 170 may be thought of as a triple-line correlator. In the presence of the 7.867 kHz video subcarrier as among three, adjacent, horizontal scan lines, data remover 170 produces an inverted subcarrier of equal amplitude, used in mixer 94 (when the REMOVE DATA switch is closed) to cancel the detected subcarrier. As shown in FIG. 5, when data remover 170 is used, video program material is preprocessed thereby before being inputted to data encoder 86 and video previewer 128, thereby enhancing the suitability of fields for modulation while substantially invisibly impacting the program material itself.

VIDEO IN is routed to a test mixer 172 the other input of which normally makes no contribution (with the TEST 1 switch open). Mixer 172 provides a video signal that is delayed by one horizontal line through a 63.556 µs delay line 174, further delayed, for reasons that will become apparent, by a compensatory delay circuit 176 and then inputted to buffer 88 of data encoder 86 and to delay line 130 of previewer 128. The output of mixer 172 is inverted by analog inverter 178, whose current output is limited by resistor R1 before it is inputted to mixer 180. This first input to mixer 180 may be thought of as contributing minus one fourth of the present horizontal line's instantaneous luminance. The current output of delay line 174 is limited by resistor R2, and becomes a second input to mixer 180. This second input to mixer 180 may be thought of as contributing plus one half of the instantaneous luminance of the previous horizontal line. The output of delay line 174 also is inputted to a delay line 182, the current output of which is inverted at 184 and limited by resistor R3, thereby forming the third input to mixer 180. This final input to mixer 180 may be thought of as contributing minus one fourth of the instantaneous luminance of the horizontal line immediately preceding the previous horizontal line.

It will be seen that the output of mixer 180 represents a weighted sum of the instantaneous luminance of three adjacent horizontal lines of VIDEO IN. In the presence of a video subcarrier at or about the 7.867 kHz frequency, the output of mixer 180 represents the inverse of the present horizontal line's luminance modulation component. This is because, as among any three adjacent horizontal lines within a data-encoded subfield, (1) one will be raised and two will be lowered in luminance, or (2) two will be raised and one will be lowered in luminance. Three adjacent horizontal lines, therefore, definitively enable the detection of a subcarrier at VIDEO IN. It will be appreciated that the weighted sum of the three inputs to mixer 180 is equal to the average amplitude of the luminance modulation between any two adjacent lines, which in the absence of luminance modulation is zero.

Those skilled in the art will appreciate that, whereas it has been found that the double-line correlator of video previewer 128, and the triple-line correlator of data remover 170, respectively enable the detection, and the removal, of encoded data or spurious data components of VIDEO IN, alternative embodiments are within the spirit of the invention. For example, an n-line correlator may be used to increase the sensitivity of the circuits to the presence of a subcarrier component, thereby to enhance the ability of video previewer 128 to detect, or of data remover 170 to suppress, encoded or spurious data. Straightforwardly, an n-input mixer may produce a weighted sum of incrementally delayed video inputs so that, in effect, previewer 128 or remover 170 takes a wider, n-line 'view' of VIDEO IN. Thus, the 36 db rejection ratio of the triple-line correlator, for example, may be increased by cascading n delay lines and defining their relative plus or minus contributions to the weighted sum in such manner that the sum is zero when no subcarrier of a particular frequency is present.

It also will be appreciated by those skilled in the art that delay lines, such as delay line 174, may, within the spirit of the invention, assume values other that 63.556 µs. Generally, delay lines are specified to impose a delay nominally equal to one half of the inverse of the subcarrier modulation frequency, as is the case in the preferred embodiment described herein. Due to the general applicability of the subliminal modulation method of the invention, of which the alternate, proportionate raising and lowering of the luminance of adjacent horizontal lines is merely one example, the subcarrier frequency may be higher or lower than 7.867 kHz, and the delay lines may impose a respectively lower or higher video delay.

Referring still to FIG. 5, it will be seen that the output of mixer 180 is filtered at 186, to eliminate undesirable, high-frequency components, including the NTSC chrominance subcarrier component nominally at 3.579 MHz, and is inverted at 188 for presentation, via REMOVE DATA switch 190, to video mixer 94. It will be understood that, due to the inherent propagation delay of the output of mixer 180 through filter 186, a compensating delay of the output of delay line 174 must be imposed, in order to ensure the synchronized arrival of inputs to video/data mixer 94. If VIDEO IN contains video features that, to the detector, would appear as luminance modulation, i.e. if VIDEO IN contains spurious data or if VIDEO IN in fact contains encoded data, then the modulation component of the present horizontal line effectively will be purged, or canceled, by adding in mixer 94 a signal of equal amplitude to, but of opposite sign from, the modulation component. Thus, the video output of output driver 126, by the operation of data remover 170, contains video program material only, rather than the combination of video program material and a luminance modulated subcarrier or video features detectable as spurious data.

When it is desired to remove data from a previously data-encoded videotape, as determined, for example, by previewing the videotape and monitoring DATA PRESENT, the user need only close REMOVE DATA switch 190, process the encoded videotape through encoding circuit 84 and record VIDEO OUT on a blank videotape. In this novel way, the data encoding process enabled by the apparatus of the present invention may be reversed to restore videotapes so processed to their prior, unencoded condition. By the inclusion in encoding circuit 84 of video previewer 128, data encoder 86 and data remover 170, videotape masters may be previewed and data encoded or restored, based upon the DATA PRESENT tagging of subfields therein. It will be appreciated that data encoder 86 and data remover 170 alternatively may be used simultaneously (1) to remove unwanted video features that are detectable as spurious data or an unwanted modulated subcarrier, and (2) to add the desired modulated subcarrier.

It is possible to test video previewer 128 and data remover 170 by injecting a 7.867 kHz signal into the second input of mixer 172 via TEST 1 switch 192. It will be appreciated that if a 7.867 kHz subcarrier is injected at mixer 172, then DATA PRESENT will indicate the presence of this pseudodata subcarrier. Similarly, it will be appreciated that if a 7.867 kHz subcarrier is injected at mixer 172, and if REMOVE DATA switch 190 is closed, then although DATA PRESENT will be active, nevertheless VIDEO OUT will contain no subcarrier component, due to the difference producing effect of data remover 170 and the cancelling effect of mixer 94. It will be understood that, were TEST 2 switch 194 open, video previewer 128 still would indicate the presence of data but, because it would depend upon simple line detection (as do receiver electronics 56) rather than dual-line correlation, previewer 128 would exhibit a lower signal-to-noise ratio. Finally, TEST 3 switch 196 permits the loop back testing of video previewer 128 and data remover 170, by presenting video program material to delay line 130 (when switch 196 is in its OFF position), or by presenting VIDEO OUT to delay line 130 (when switch 196 is in its ON position).

The preferred method of the present invention now may be understood, in light of the apparatus described herein. By luminance modulating alternate horizontal scan lines of successive video subfields within the viewing area of a television in a manner that the modulation is substantially invisible to the television viewer, a composite video signal containing video program material and control data may be produced, e.g. by the use of encoding circuit 84. By detecting the video subcarrier component, as, for example, by detecting means including transducer 16 and detector 56, the encoded data may be reproduced, at or near the television but asynchronously relative to the raster scan timing thereof, for ancillary use, e.g. to control an interactive device.

The composite video signal containing the video program material and the control data may be produced by identifying, as by tagging and logging, a sequence of consecutive fields that are suitable for data encoding, e.g. by the use of video previewer 128. Optionally, e.g. by the use of data remover 170, fields containing encoded or spurious data may be purged of the video subcarrier, thereby rendering them suitable for data encoding, e.g. by the use of data encoder 86. The formatting of a binary data sequence, e.g. by the use of computer means that has access to the DATA PRESENT, TOO WHITE and TOO BLACK signals, permits the control data sequence to be fitted within the identified field sequence. After generating synchronization signals defining a window that circumscribes an included video subfield, program material and control data may be mixed, within the window and in response to the signals, by luminance modulating the program material with the control data. It will be appreciated that, while analog means of previewing, encoding and restoring videotapes are described herein, nevertheless the use of digital means, e.g. by the manipulation of gray scale-coded pixels within a frame buffer, is within the spirit of the invention.

Broadcasting the composite video signal produced by the steps described immediately above enables one or more televisions to receive the signal, enables detecting means proximate thereto to reproduce the data, and enables an IR modulator and IRED array locally to transmit the data, causing interactive devices to respond to the data-encoded program material. In the preferred method of the invention, the detecting is performed by locally optically coupling the modulation, e.g. via transducer 16, to receiver electronics, wherein the program material is discriminated from the control data. By amplitude modulating an IR carrier with the control data, the latter inaudibly and wirelessly may be communicated to interactive devices within range of the transmission.

The advantages offered by the invention should be apparent to those skilled in the art. The method and apparatus disclosed herein enable subliminal, in-band, data communication over conventional television broadcast channels, for ancillary use at a site local to the home television viewer. Detection apparatus, including an optical transducer which unobtrusively monitors any desired region within a program viewing area of the television screen, enables receiver/transmitter electronics to discriminate control data from random video noise, and locally to transmit the control data to one or more interactive devices within its IR transmission range. Such interactive devices flexibly may be programmed to initiate predefined actions in response to the television program's story line. The apparatus requires no electrical connections to the television receiver or antenna, and wirelessly, remotely controls interactive devices within a television viewer's home. Interactive devices that remotely may be controlled by the method and apparatus of the invention include educational, as well as entertainment, devices.

It will be appreciated by those skilled in the art that, within the spirit of the present invention, means for detecting the subliminal modulation of the video program signal may be embodied in a hand manipulable probe, which probe itself may be the interactive device remotely controlled by the control data, thereby obviating the requirement of local communication of the reconstructed control data. It also will be appreciated that, within the spirit of the invention, the communication of control data to an interactive device may be accomplished by other than IR means, e.g. an RF transmitter located adjacent the television may communicate the control data to an RF receiver within the interactive device, or an RF antenna- and receiver-equipped interactive device directly may detect the RF emanations from the television, in accordance with the modification to the preferred embodiment that is proposed herein.

Accordingly, while a preferred method for practicing the invention, and a preferred embodiment of the apparatus of the invention and a proposed modification thereto have been described herein, it is appreciated that further modifications are possible that come within the scope of the invention.

It is claimed and desired to secure by Letters Patent:

1. In conjunction with a method for producing a composite video signal containing video program material and control data, and displaying the signal on a television and decoding such control data for ancillary use, an improvement comprising:
    modulating at least one video field within the viewing area of a television in such manner that the modulation producing a video subcarrier component of the signal, the component containing the data; and
    detecting the component to reproduce the data for the ancillary use.

2. The improvement of claim 1, wherein the detecting is performed opto-electronically.

3. The improvement of claim 2, wherein the detecting is performed by locally optically coupling the modulation to receiver electronics having means for discriminating the program material from the control data.

4. The improvement of claim 1, wherein the detecting is performed asynchronously relative to the raster scan timing of the television.

5. The improvement of claim 1, wherein the modulating is of alternate horizontal scan lines within each field.

6. The improvement of claim 1, which further comprises previewing the video program material, prior to the modulating, to select at least one field suitable for data encoding, wherein the modulating is performed selectively on such a selected field 7. The improvement of claim 5, which further comprises processing the video program material, prior to the modulating, to enhance the suitability of at least one field for modulating, the processing being performed in such manner that the enhancement is substantially invisible to the television viewer.

8. The improvement of claim 7, wherein said processing includes purging at least one field of video features which otherwise would be detectable as such video subcarrier component.

9. A method for producing a composite video signal containing pre-recorded video program material and control data for the display of the signal by a television for viewing thereon the program material and for the detection of the control data by external equipment for ancillary use, comprising:
    identifying at least one sequence of consecutive fields of the program material wherein each field contains at least one included video subfield that is capable of being subliminally and detectably modulated with at least one bit of binary data;
    formatting at least one binary data sequence containing the control data in such manner that the data sequence can be fitted within the field sequence;
    generating synchronization signals defining a window that circumscribes the video subfields; and
    mixing the program material and the data within the field sequence, and within the window in response to the signals, by modulating the material by the data in such manner that the modulating is substantially invisible to a viewer of the television and is detectable for the ancillary use.

10. The method of claim 9, wherein the mixing is performed by luminance modulating the material by the data in such manner that the overall luminance level within the window is preserved.

11. The method of claim 9, wherein the mixing is performed by chrominance modulating the material by the data in such manner that the overall chrominance level within the window is preserved.

12. The method of claims 9, 10 or 11, wherein the mixing is performed by modulating the material by the data in such manner that the spatial relationship among picture elements within the window is preserved.

13. The method of claim 9, wherein the mixing is performed by luminance modulating alternate horizontal scan lines within the window whereby, as between any two adjacent scan lines, the luminance level of a first is raised by a predetermined percentage and the luminance level of a second is lowered by substantially the same percentage, the modulation being detectable as an indication of the presence and sense of the control data.

14. The method of claim 9, wherein the mixing is performed by chrominance modulating alternate horizontal scan lines within the window whereby, as between any two adjacent scan lines, the chrominance level of a first is raised by a predetermined percentage and the chrominance level of a second is lowered by substantially the same percentage, the modulation being detectable as an indication of the presence and sense of the control data.

15. A method for remotely controlling interactive devices by broadcasting composite video information to a television, comprising:
producing a composite video signal containing program material and control data by modulating selected viewing areas of the program material with the control data, thereby creating a video subcarrier component of the signal, the component containing the data;
broadcasting the signal to at least one television;
receiving the signal at at least one television;
detecting, adjacent at least one television, the component to reproduce the data; and
transmitting the data to enable interactive devices within range of the transmission to act, responsive to the program material, in a predetermined manner.

16. The method of claim 15, wherein the producing is performed in such manner that the modulation is substantially invisible to a television viewer.

17. The method of claim 16, wherein the producing is performed by luminance modulating selected viewing areas of the program material with the control data.

18. The method of claim 16, wherein the producing is performed by chrominance modulating selected viewing areas of the program material with the control data.

19. The method of claim 15, wherein the detecting is performed opto-electronically.

20. The method of claim 19, wherein the detecting is performed by locally optically coupling the modulation to receiver electronics having means for discriminating the program material from the control data.

21. The method of claim 20, wherein the transmitting is performed wirelessly.

22. The method of claim 21, wherein the transmitting is performed optically.

23. The method of claim 22, wherein the transmitting is performed within the infrared spectrum.

24. Apparatus for the remote control of interactive devices by the broadcast of composite video information to televisions, comprising:
means for generating a program signal containing a video program;
means for generating a data signal containing control data;
means for subliminally modulating the program signal by the data signal in timed relation thereto, thereby producing a control data-modulated video subcarrier detectable as digital modulation in at least one predefined viewing area of at least one television;
means adjacent at least one television for detecting the modulation in at least one viewing area to produce a control data sequence; and
means for controlling, in predetermined response to the data sequence, the actions of at least one of the interactive devices 25. The apparatus of claim 24, wherein the modulating means produces a video subcarrier that is substantially invisible to a television viewer.

26. The apparatus of claim 25, wherein the detecting means includes means for optically coupling the modulation to receiver electronics having means for discriminating the program signal from the data signal.

27. The apparatus of claim 26, wherein the coupling means includes a light sensitive device.

28. The apparatus of claim 25, wherein the controlling means includes means for wirelessly transmitting the data sequence to at least one of the interactive devices.

29. The apparatus of claim 28, wherein the transmitting means is optical.

30. The apparatus of claim 29, wherein the transmitting means operates within the infrared spectrum.

31. Apparatus for the remote control of at least one interactive device by the production of composite video information containing program material and control data, the video information having been produced by modulating selected viewing areas of the program material with the control data to produce a video subcarrier component, the component containing the data, for viewing the program material on television screens, comprising:
means adjacent at least one of the television screens for detecting the control data modulation-produced video subcarrier component to reproduce the data, and
means for communicating such reproduced control data to at least one interactive device.

32. The apparatus of claim 31, further comprising means for producing the composite video information in such manner that the control data are substantially invisible to a television viewer.

33. The apparatus of claim 32, wherein the communication means is wireless and includes an infrared transmitter.

34. The apparatus of claim 33, further including means for modulating a carrier to represent the control data, the carrier being of a frequency above the audible range.

35. The apparatus of claim 32, wherein the data are binary, and are communicated bit-serially.

36. The apparatus of claim 35, wherein the data are transmitted in accordance with an asynchronous protocol.

37. The apparatus of claim 36, further comprising at least one interactive device, each including an infrared receiver capable of receiving the control data, and a controller capable of initiating a predefined action in response thereto.

38. The apparatus of claim 37, wherein the data include a command field and an address field, and wherein each of the controllers responds to the control data by comparing the address field to at least one predefined value, and selectively initiating the action defined by the command field when the address field is equal to at least one such predefined value.

39. For use with the production of a composite video signal containing video program material for display on a television, the composite video signal further containing a video subcarrier component that contains control data for the remote control of interactive devices located proximate to the television and for use with apparatus capable of detecting such component and decoding and communicating such control data, an interactive device comprising:
- a receiver capable of receiving the control data communicated by such apparatus, and
- a controller capable of initiating a predefined action in response to such received control data.

40. The device of claim 39, wherein the control data includes a command field and an address field, the device further comprising address responsive means for selectively initiating a predefined action only when the address field corresponds to at least one preassigned device-specific address.

41. The device of claim 39, wherein the communication of control data is performed by wireless optical transmission, and wherein the receiver includes light responsive means for detecting and validating the control data.

42. The device of claim 41, wherein the transmission is within the infrared spectrum and the light responsive means is selectively responsive to energy within the infrared spectrum.

43. The device of claim 42, wherein an infrared carrier at a frequency above the audible range is modulated by the control data, and wherein the light responsive means includes carrier detecting means for selectively responding to infrared energy generally at the frequency of the carrier.

44. The device of claim 43, wherein the communication of the control data is performed in accordance with an asynchronous protocol.

45. Apparatus for the control of at least one interactive device by the presentation of composite video information containing program material and control data to at least one television for viewing thereon the program material, the video information being produced by modulating the program material, within a viewing area of the television, with the control data to produce a video subcarrier capable of indicating the presence and sense of the control data, comprising:
- means proximate to the television for detecting the subcarrier to reproduce the data, and
- means responsive to such reproduced data for controlling at least one interactive device.

46. Apparatus for the remote control of at least one interactive device by the broadcast of composite video information containing program material and control data to television for viewing the program material on the screens thereof, the video information having been produced by modulating selected viewing areas of the program material with the control data to produce a video subcarrier component, the component containing the data, the modulating having been performed in such manner that the modulation is substantially invisible to the television viewer, comprising:
- means adjacent the television for detecting the component to reproduce the data, and
- means responsive to such reproduced data for controlling at least one interactive device.

47. In conjunction with a method for producing a composite video signal containing video program material and control data, and displaying the signal on a television and decoding such control data for ancillary use, the improvement comprising:
- modulating at least one video field within the viewing area of a television in such manner that the modulation is substantially invisible to the television viewer, the modulating being of alternate horizontal scan lines within the field, thereby producing a component of the signal which indicates the presence and sense of the data, and
- detecting the component to reproduce the data for the ancillary use.

48. A method for remotely controlling interactive devices by broadcasting composite video information to a television, comprising:
- producing a composite video signal containing program material and control data by modulating selected viewing areas of the program material with the control data, the modulating being of alternate horizontal scan lines within selected video fields of the program material, thereby creating a component of the signal which indicates the presence and sense of the data;
- broadcasting the signal to at least one television;
- detecting, adjacent at least one television, the component to reproduce the data; and
- transmitting the data to enable interactive devices within range of the transmission to act, responsive to the program material, in a predetermined manner.

49. Apparatus for the remote control of interactive devices by the broadcast of composite video information to televisions, comprising:
- means for generating a program signal containing a video program;
- means for generating a data signal containing control data;
- means for subliminally modulating the program signal by the data signal in timed relation thereto, the modulating being of alternate horizontal scan lines within a video field and within the viewing areas of at least one television, thereby producing a data-modulated video component detectable as digital modulation within the viewing area;
- means adjacent at least one television for detecting the modulation within the viewing area to produce a control data sequence; and
- means for controlling, in predetermined response to the data sequence, the actions of at least one of the interactive devices.

50. For use with a composite video signal containing program material for viewing on a television and control data for controlling at least one interactive device, wherein the presence and sense of the control data are defined by the presence, in the viewing area of the television, of substantially invisible luminance modulation within selected video fields, apparatus comprising:
- means adjacent the television for detecting the presence of luminance modulation within the selected video fields, the detecting means being responsive to substantially invisible luminance modulation, within the viewing areas of the television, at a modulation frequency substantially greater than the field frequency of the television, thereby to reproduce the data, and
- means responsive to such reproduced data for controlling at least one interactive device.

51. For use in conjunction with a system which includes a video display that is luminance modulated to contain encoded data related to display activity, and a data-encoded luminance modulation-responsive translator capable of locally projecting, into a projection field, encoded light-borne information derived from such control data, a system-responsive interactive device including
a receiver adapted to receive such projected information when within such field,
a controller operatively connected to the receiver and specifically adapted to decode such information, thus to produce related control signals, and
activity-producing means operatively coupled to the controller and responsive to the control signals to generate in the device activity which is related to the data contents of such luminance modulated video display, thus to coordinate device activity with display activity.

52. For use in conjunction with a system which includes a video display that is luminance modulated to contain encoded data related to display activity, and a data-encoded luminance modulation-responsive receiver/transmitter capable of transmitting over a predefined range a modulated light carrier, the light being within a predefined spectrum, the carrier being of a predefined frequency, and the light carrier being modulated by such data,
a display activity-imitative interactive device including
light responsive means adapted to respond to light within such predefined spectrum when within range of such transmission,
carrier detecting means operatively connected to the light responsive means and tuned to such predefined carrier frequency, thus to produce a demodulated digital signal representative of the encoded data,
a controller operatively connected to the carrier detecting means and specifically adapted to decode the data, thus to produce related control signals, and
activity-producing means operatively coupled to the controller and responsive to the control signals to produce display activity-imitative device activity.

* * * * *

UNITED STATES PATENT AND TRADEMARK OFFICE
CERTIFICATE OF CORRECTION

PATENT NO. : 4,807,031

DATED : February 21, 1989

INVENTOR(S) : Robert S. Broughton and William C. Laumeister

It is certified that error appears in the above-identified patent and that said Letters Patent is hereby corrected as shown below:

In the Specification:

Column 3, lines 50 through 51, after "advantages" insert --:--.

In column 5, line 27, after "16" insert --.--.

In column 8, line 64, change "filed" to --field--.

In column 9, line 49, after "signal" (first occurence), insert --.--.

In column 10, line 24, change "control, signals" to --control signals,--.

In the Claims:

In claim 1, line 8 (column 17, line 67), before "producing" insert --is substantially invisible to the television viewer, thereby--.

In claim 6, line 5 (column 18, line 18), after "field" add --.--.

In claim 24, line 19 (column 20, line 3), after "devices" add --.--.

In claim 46, line 4 (column 21, line 49), change "television" to --televisions--.

In claim 49, line 11 (column 22, line 35), change "areas" to --area--.

In claim 50, line 12 (column 22, line 56), change "areas" to --area--.

Signed and Sealed this

Fifteenth Day of August, 1989

Attest:

DONALD J. QUIGG

*Attesting Officer*   *Commissioner of Patents and Trademarks*